US007717629B2

(12) United States Patent
Kenoyer et al.

(10) Patent No.: US 7,717,629 B2
(45) Date of Patent: *May 18, 2010

(54) COORDINATED CAMERA PAN TILT MECHANISM

(75) Inventors: Michael L. Kenoyer, Austin, TX (US); William V. Oxford, Austin, TX (US); Patrick D. Vanderwilt, Austin, TX (US); Hans-Christoph Haenlein, San Jose, CA (US); Jonathan I. Kaplan, Palo Alto, CA (US); Branko Lukic, Menlo Park, CA (US)

(73) Assignee: LifeSize Communications, Inc., Austin, TX (US)

( * ) Notice: Subject to any disclaimer, the term of this patent is extended or adjusted under 35 U.S.C. 154(b) by 1008 days.

This patent is subject to a terminal disclaimer.

(21) Appl. No.: 11/404,583

(22) Filed: Apr. 14, 2006

(65) Prior Publication Data
US 2006/0269278 A1    Nov. 30, 2006

Related U.S. Application Data

(63) Continuation-in-part of application No. 11/251,083, filed on Oct. 14, 2005, now Pat. No. 7,473,040.

(60) Provisional application No. 60/619,227, filed on Oct. 15, 2004, provisional application No. 60/675,964, filed on Apr. 29, 2005, provisional application No. 60/675,966, filed on Apr. 29, 2005.

(51) Int. Cl.
*G03B 17/00* (2006.01)

(52) U.S. Cl. .................................. 396/428; 348/169
(58) Field of Classification Search ................ 396/427; 348/14.08, 14.09; 352/69
See application file for complete search history.

(56) References Cited

U.S. PATENT DOCUMENTS 4,264,928 A    4/1981    Schober (Continued)

FOREIGN PATENT DOCUMENTS

JP    2000/197151    7/2000

OTHER PUBLICATIONS

Office Action of Mar. 19, 2008, in U.S. Appl. No. 11/251,083, 20 pages (available in PAIR).

(Continued)

*Primary Examiner*—Christopher E Mahoney
*Assistant Examiner*—Autumn Parker
(74) *Attorney, Agent, or Firm*—Meyertons Hood Kivlin Kowert & Goetzel, P.C.; Jeffrey C. Hood (57) ABSTRACT

In various embodiments, a camera may be controlled by one or more motors in a base of the camera. Cables and other components may be used to manipulate the camera lens through the side arms of the camera. Putting the motors in the base may reduce the size of the outer case of the camera and add stability. A pan motor may pan the camera while a tilt motor may move a tilt pulley relative to a lens portion of the camera (which may or may not tilt the camera depending on the panning motion of the camera). In some embodiments, images from the camera may be converted into a serialized stream and transported over a cable from the lens through a center shaft of the camera.

12 Claims, 8 Drawing Sheets

U.S. PATENT DOCUMENTS

| | | | |
|---|---|---|---|
| 4,673,268 A * | 6/1987 | Wheeler et al. | 352/243 |
| 5,034,947 A | 7/1991 | Epps | |
| 5,054,021 A | 10/1991 | Epps | |
| 5,374,971 A | 12/1994 | Clapp et al. | |
| 5,486,853 A | 1/1996 | Baxter et al. | |
| 5,515,099 A | 5/1996 | Cortjens et al. | |
| 5,528,289 A | 6/1996 | Cortjens et al. | |
| 5,537,157 A * | 7/1996 | Washino et al. | 348/722 |
| 5,598,209 A | 1/1997 | Cortjens et al. | |
| 5,612,733 A | 3/1997 | Flohr | |
| 5,617,539 A | 4/1997 | Ludwig et al. | |
| 5,633,681 A | 5/1997 | Baxter et al. | |
| 5,657,096 A | 8/1997 | Lukacs | |
| 5,689,641 A | 11/1997 | Ludwig et al. | |
| 5,692,159 A | 11/1997 | Shand | |
| 5,737,011 A | 4/1998 | Lukacs | |
| 5,737,431 A | 4/1998 | Brandstein et al. | |
| 5,751,338 A | 5/1998 | Ludwig, Jr. | |
| 5,764,277 A | 6/1998 | Loui et al. | |
| 5,821,987 A | 10/1998 | Larson | |
| 5,896,128 A | 4/1999 | Boyer | |
| 6,072,522 A | 6/2000 | Ippolito et al. | |
| 6,124,892 A | 9/2000 | Nakano | |
| 6,356,308 B1 | 3/2002 | Hovanky | |
| 6,587,823 B1 | 7/2003 | Kang et al. | |
| 6,590,604 B1 | 7/2003 | Tucker et al. | |
| 6,593,956 B1 | 7/2003 | Potts et al. | |
| 6,594,688 B2 | 7/2003 | Ludwig et al. | |
| 6,643,462 B2 | 11/2003 | Harand et al. | |
| 6,724,619 B2 | 4/2004 | Kwong et al. | |
| 6,731,334 B1 | 5/2004 | Maeng et al. | |
| 6,809,358 B2 | 10/2004 | Hsieh et al. | |
| 6,816,904 B1 | 11/2004 | Ludwig et al. | |
| 6,822,507 B2 | 11/2004 | Buchele | |
| 6,850,265 B1 | 2/2005 | Strubbe et al. | |
| 6,912,178 B2 | 6/2005 | Chu et al. | |
| D510,589 S | 10/2005 | Andre et al. | |
| 6,980,485 B2 | 12/2005 | McCaskill | |
| 7,012,630 B2 | 3/2006 | Curry et al. | |
| 7,038,709 B1 | 5/2006 | Verghese | |
| 7,046,295 B2 | 5/2006 | Hovanky | |
| 7,130,428 B2 | 10/2006 | Hirai et al. | |
| 7,202,904 B2 | 4/2007 | Wei | |
| 7,339,605 B2 | 3/2008 | Rodman et al. | |
| 7,397,495 B2 | 7/2008 | Girish et al. | |
| 2001/0045991 A1 * | 11/2001 | Van Rens et al. | 348/373 |
| 2003/0103770 A1 | 6/2003 | Arbuckle | |
| 2004/0001137 A1 | 1/2004 | Cutler et al. | |
| 2004/0183897 A1 | 9/2004 | Kenoyer et al. | |
| 2004/0257432 A1 | 12/2004 | Girish et al. | |
| 2005/0212908 A1 | 9/2005 | Rodman et al. | |
| 2005/0262201 A1 | 11/2005 | Rudolph et al. | |
| 2006/0013416 A1 | 1/2006 | Truong et al. | |
| 2006/0034469 A1 | 2/2006 | Tamiya et al. | |
| 2006/0082655 A1 | 4/2006 | Vanderwilt et al. | |
| 2006/0104458 A1 | 5/2006 | Kenoyer et al. | |
| 2006/0104633 A1 | 5/2006 | Kenoyer et al. | |
| 2006/0165242 A1 | 7/2006 | Miki et al. | |
| 2006/0238611 A1 | 10/2006 | Kenoyer et al. | |
| 2006/0256983 A1 | 11/2006 | Kenoyer et al. | |
| 2007/0053681 A1 | 3/2007 | Arbuckle | |

OTHER PUBLICATIONS

Office Action of May 14, 2008, in U.S. Appl. No. 11/119,584, 17 pages (available in PAIR).

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages (reference states last updated Feb. 3, 2004).

Peter Klein; "Video Workplace Conference"; IEEE Proceedings of Globecom; 1985 (month unknown); pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; "Microsoft Array project in MSR: approach and results", http://research.microsoft.com/users/ivantash/Documents/MicArraysInMSR.pdf; Jun. 2004; 49 pages.

"Press Releases"; Retrieved from the Internet: http://www.acousticmagic.com/press/; Mar. 14, 2003-Jun. 12, 2006; 18 pages; ACOUSTIC MAGIC.

Marc Gayer, Markus Lohwasser and Man Fred Lutzky; "Implementing MPEG Advanced Audio Coding and Layer-3 encoders on 32-bit and 16-bit fixed-point processors" ; Jun. 25, 2004; 7 pages.; Revision 1.11; Fraunhofer Institute for Integrated Circuits IIS; Erlangen, Germany.

Notice of Allowance of Sep. 22, 2008, in U.S. Appl. No. 11/251,083, 15 pages.

Machine translation of JP 2000197151, 11 pages.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System" ; Multimedia '02; Dec. 2002; 10 pages; Microsoft Research; Redmond, WA.

P. H. Down; "Introduction to Videoconferencing"; http://www.video.ja.net/intro/; 2001; 26 pages.

Peter Meyers; "Adding Eye Contact to Your Web Chats"; The New York Times; Sep. 4, 2003; 5 pages.

"Polycom Executive Collection"; Jun. 2003; 4 pages; Polycom, Inc.; Pleasanton, CA.

* cited by examiner

COORDINATED CAMERA PAN TILT MECHANISM

PRIORITY CLAIM

This application is a continuation-in-part application of U.S. patent application Ser. No. 11/251,083 titled "High Definition Camera Pan Tilt Mechanism", which was filed Oct. 14, 2005, now U.S. Pat. No. 7,473,040 whose inventors are Michael L. Kenoyer, William V. Oxford, Patrick D. Vanderwilt, Hans-Christoph Haenlein, Branko Lukic and Jonathan I. Kaplan (which claims benefit of priority to provisional application Ser. No. 60/619,227 titled "High Definition Camera and Mount" which was filed on Oct. 15, 2004, whose inventors are Michael L. Kenover. Patrick D. Vanderwilt. Paul D. Frey, Paul Leslie Howard, Jonathan I. Kaplan, and Branko Lukic and which claims benefit of priority to U.S. Provisional Patent Application Ser. No. 60/675,964, titled "Camera Support Mechanism", which was filed Apr. 29, 2005, whose inventors are Michael L. Kenoyer. Patrick D. Vanderwilt. Paul D. Frey. Paul Leslie Howard, Jonathan I. Kaplan, and Branko Lukic and which claims priority to U.S. Provisional Patent Application Ser. No. 60/675,966 titled "Camera Pan/Tilt Mechanism", which was filed Apr. 29, 2005, whose inventors are Michael L. Kenoyer. Patrick D. Vanderwilt, Paul D. Frey, Paul Leslie Howard, Jonathan I. Kaplan, and Branko Lukic) which is hereby incorporated by reference in its entirety as though fully and completely set forth herein.

This application also claims priority to U.S. Provisional Patent Application Ser. No. 60/675,964 titled "Camera Support Mechanism", which was filed Apr. 29, 2005, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

This application further claims priority to U.S. Provisional Patent Application Ser. No. 60/675,966 titled "Camera Pan/Tilt Mechanism", which was filed Apr. 29, 2005, whose inventors are Michael L. Kenoyer, Patrick D. Vanderwilt, Paul D. Frey, Paul Leslie Howard, Jonathan I. Kaplan, and Branko Lukic which is hereby incorporated by reference in its entirety as though fully and completely set forth herein.

BACKGROUND OF THE INVENTION

1. Field of the Invention

The present invention relates generally to cameras and, more specifically, to video camera pan tilt mechanisms.

2. Description of the Related Art

Cameras may be used in a number of video applications. For example, cameras may be used in filming movies or providing live video in video conferences. Camera types may include film and charge-coupled device (CCD) among others. Cameras often include a lens portion mounted to a stand. The lens portion may be aimed at a subject by panning or tilting the lens. The lens portion may be moved directly by a user or indirectly through a motor coupled to the lens portion. Some camera lenses may also be zoomed in or out on a subject.

SUMMARY OF THE INVENTION

In various embodiments, a camera (e.g., a High Definition (HD) pan-tilt-zoom (PTZ) camera) may have a lens portion and a base portion coupled to each other through one or more arm portions. The camera may be controlled by one or more motors in the camera's base. A tilt motor in the camera base may control the tilt of the camera, while a pan motor in the camera base may pan the camera. In some embodiments, the pan and tilt motors may work together to pan and/or tilt the camera. The tilt and pan motors may be coupled to plates in the base of the camera. The tilt motor may also be coupled to cables in an arm portion of the camera.

Putting the motors in the base may reduce the size of the outer case of the camera and add stability. In some embodiments, images from the camera may be converted into a serialized digital stream and transported over a data cable from the lens through a center shaft of the camera. This may allow the placement of several components for processing images, etc. in a base of the camera instead of in the lens portion. Other information may also be sent over the data cable (e.g., bi-directional control data and power). Other components in the lens portion and/or base portion may also be used to increase the functionality of the camera.

In various embodiments, cables and other components may be used to manipulate the camera lens through the side arms of the camera. Putting the motors in the base may reduce the size of the outer case of the camera and add stability. In some embodiments, images from the camera may be converted into a serialized stream and transported over a cable from the lens through a center shaft of the camera. Other components may also be used to increase the functionality of the camera.

In various embodiments, a camera support mechanism (CSM) may be used to couple a camera to a display. In some embodiments, the CSM may have a flat top that folds open to access a tripod mount screw that couples the camera to the CSM. After attaching the camera to the top of the CSM, the CSM may be placed on the top center of the display device. The CSM may have an adjustable front lip that aligns to the top front edge of the display device. In some embodiments, the front lip may be attached to a lower deck through a mount screw. The front lip may have two separate offsets that may cushion the contact with the display. In some embodiments, if multiple pads are used, the CSM may work with display devices that have either a concave or a convex front surface. The front lip may be adjusted to one of a number of set positions so that the CSM can accommodate even extremely thin screens that may be wall mounted.

In some embodiments, when the CSM is placed on the display, a user may tighten an adjustment knob on one side of the pivot point at the rear of the CSM. This may rotate the adjustable rear leg towards the back of the display. In some embodiments, the rear leg may rotate from flat and parallel to the top of the display to perpendicular to the top of the display. When the rear leg has rotated to the point where it makes contact with the display, further tightening of the knobs may apply additional pressure. The rear leg may be tightened to lock the rear leg firmly against the back of the display at that position. In some embodiments, the rear leg may have a foam/rubber tip for better gripping. In some embodiments, the CSM may also accommodate variable slope on the screen from front to back using the foam/rubber tip.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

Figure 1:
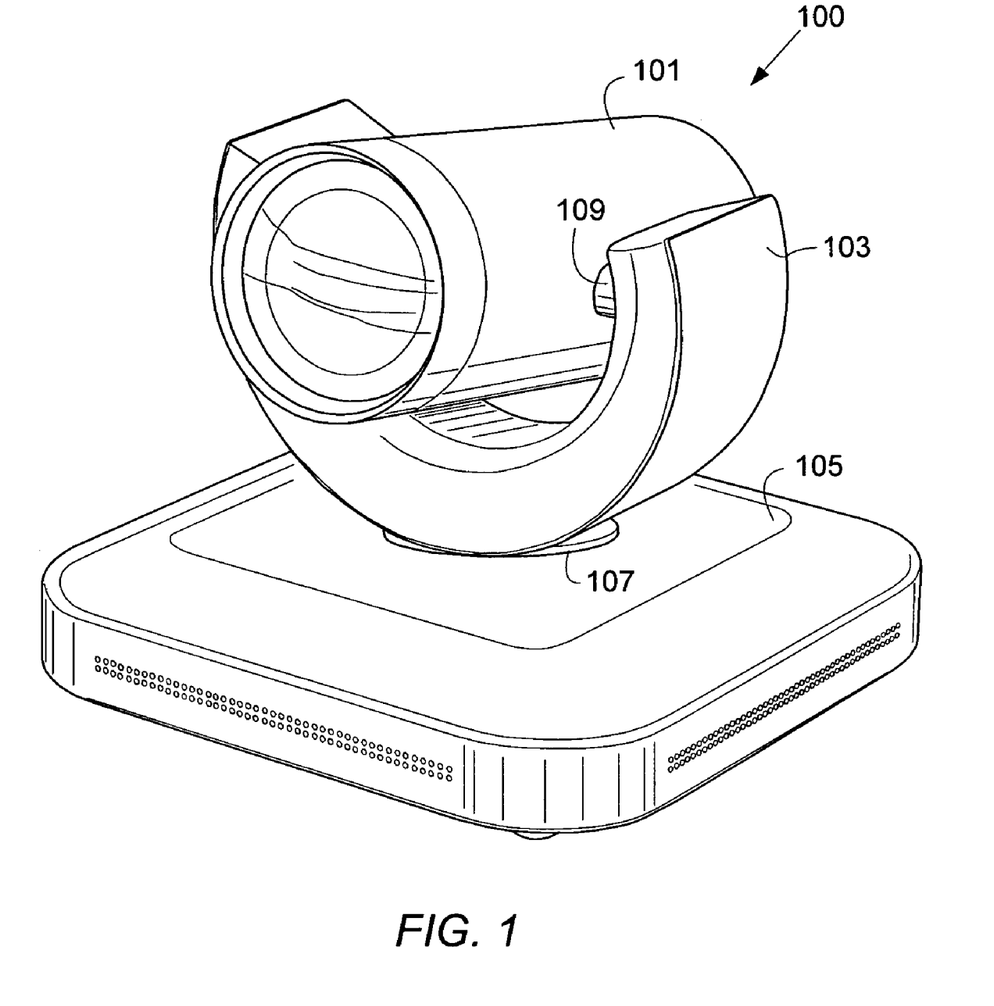
FIG. 1 illustrates a camera mounted to a base through yoke arms, according to an embodiment.

FIG. 1 illustrates a camera mounted to a base through yoke arms, according to an embodiment. In some embodiments, the camera 100 (e.g., a HD PTZ camera) may be used to provide video of participants during a video conference call. In some embodiments, the camera may be a companion HiDef PTZ camera with a resolution of 1280×720 at 30 frames per second (fps). Other cameras, resolutions, and frame rates are also contemplated.

In some embodiments, the camera 100 may have a lens portion 101 coupled to a base 105 by one or more arm portions (e.g., camera yoke arms 103). In some embodiments, the lens portion 101 may be panned and/or tilted by motors (i.e., a device that converts one or more forms of energy into mechanical energy) in the base 105. For example, an electromechanical motor may be used. In some embodiments, the motor may be a step motor. Other motors are also contemplated. The lens portion 101 may be pointed towards a participant or another source of visual interest. In some embodiments, the lens portion 101 may be panned by a motor turning a base shaft 107. In some embodiments, the lens portion 101 may be tilted by a motor turning a rod 109. In some embodiments, the pan motor and the tilt motor may be in the base of the camera 100. Other locations of the pan and tilt motors are also contemplated. In some embodiments, one motor may be used for panning and tilting the camera 100. In some embodiments, multiple motors may be used for panning and/or tilting the camera.

In some embodiments, multiple motors in the camera base may be used together to pan and/or tilt the camera 100. For example, a Field Programmable Gate Array (FPGA) (e.g., see FPGA 321 in FIG. 3) in the camera 100 may receive a serial command (e.g., from a video conferencing system codec) to move the camera 100. The FPGA 321 may calculate a response to send to each motor in the base to move the camera to the requested position. The FPGA 321 may store or have access to a memory medium storing the position of the camera and/or motors. In some embodiments, the response may be a stepping wave that includes an acceleration phase, a constant move phase, and a deceleration phase. Other response patterns are also contemplated (e.g., the response may be a straight response for the motor to move at a predefined speed to a designated position). The FPGA 321 may receive other types of serial commands. For example, the FPGA 321 may be requested to move the camera to a preset position, to pan/tilt the camera at a specified speed, to move the camera to a specified position as fast as possible, to continue moving the camera until a command is received to stop, etc. The FPGA 321 may translate these commands into a response to send to each motor (or a subset of motors) in the camera 100. In some embodiments, the FPGA 321 and/or other camera components may be encased in an electromagnetic interference (EMI) shield (e.g., made of sheetmetal).

Figure 2:
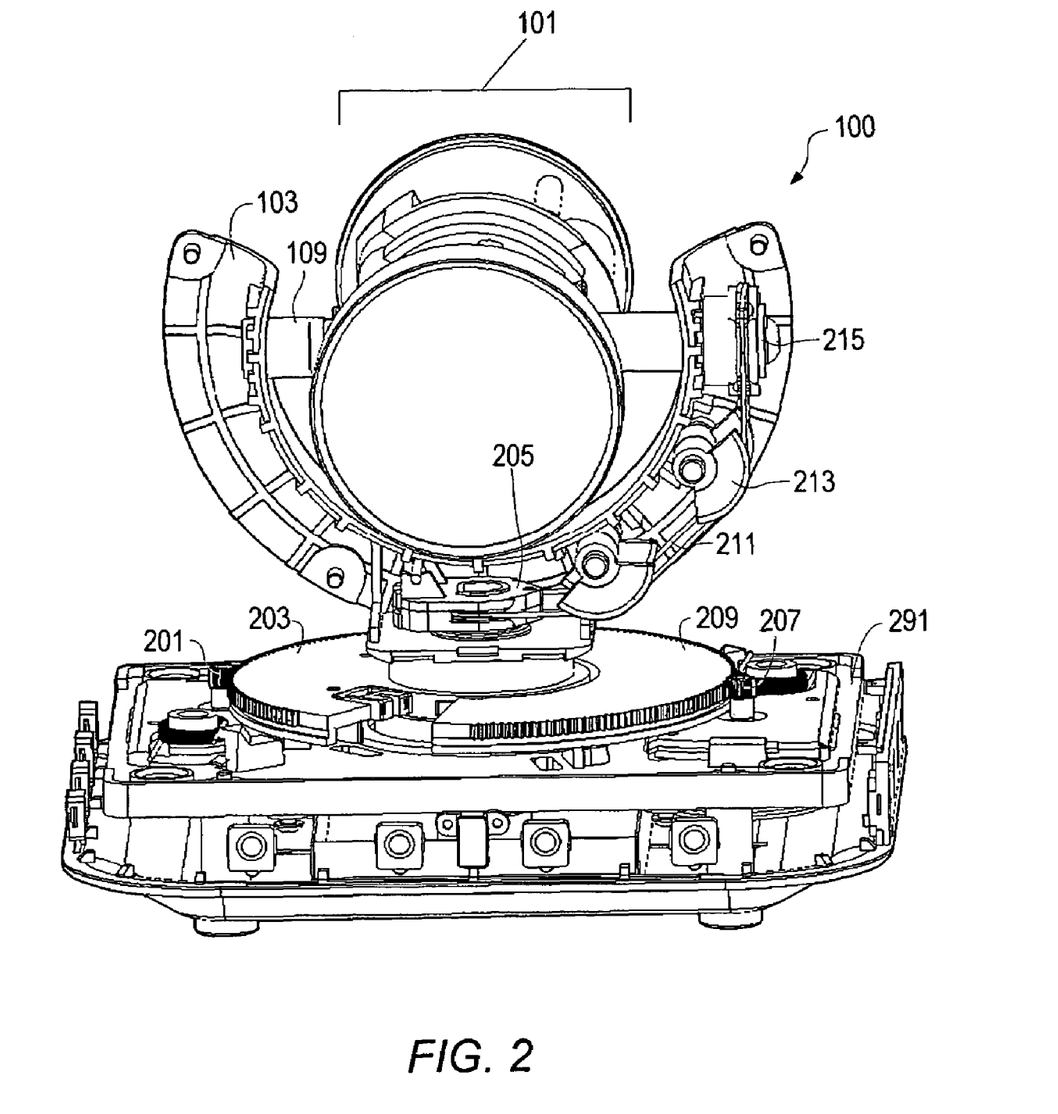
FIG. 2 illustrates a cutaway view of the camera, according to an embodiment.

FIG. 2 illustrates a cutaway view of a camera 100, according to an embodiment. In some embodiments, a pan motor 201 and/or tilt motor 207 may be in the base of the camera 100. Putting the motors in the base may reduce the size of the outer case of the camera 100 and add stability. Pan motor 201 and tilt motor 207 may substantially control movement of the camera 100 (the main bodies of motor 201 and 207 may be located below reference plate 291 with the gear segment of the motor protruding through the reference plate 291).

In some embodiments, pan motor 201 may rotate a pan plate 203 that may pan the camera 100 to the left or right. In some embodiments, the pan motor 201 may turn a gear with teeth that interlock with teeth on the plate 203 to rotate the camera 100 through a range of motion (e.g., 180 degrees) left to right. In some embodiments, a larger or smaller range of motion may be implemented. Other sizes of plates 203 may also be used. For example, a larger plate may allow a larger range of motion.

In some embodiments, a tilt motor 207 may turn a tilt plate 209 using a gear with teeth that interlock with teeth on the tilt plate 209. The tilt plate 209 may turn a tilt pulley 205 that may pull cable 211 (e.g., flexible stainless steel cable) to the left or right (depending on which way the plate 209 is rotated). Other cable types are also contemplated. The cable 211 may rotate a tilt wheel 215 that may turn a rod 109 to tilt the camera 100 in the up and down direction. Offsetting connectors 213 with grooves for the cable 211 may hold the cable 211 away from the side of the interior of the camera 100 while also allowing the cable 211 to move back and forth along the interior of the camera yoke arm 103. While two sets of offsetting connectors 213 are shown, other numbers of offsetting connectors 213 may also be used.

In some embodiments, if the pan plate 203 pans the yoke arm 103 and lens portion 101, while the tilt motor 207 (and correspondingly the tilt plate 209 and tilt pulley 205) remain stationary, the cable 211 may move inside the yoke arm 103 as the yoke arm 103 is panned relative to the tilt pulley 205. The motion of the cable 211 may rotate the rod 109 as the lens portion 101 pans resulting in the lens portion 101 tilting as the lens portion 101 is panned. In some embodiments, the tilt motor 207 may be operable to rotate the tilt pulley 205 through the tilt plate 209 during a panning motion to offset relative motion of the tilt pulley 205 with respect to the lens portion 101. The cable 211 may then remain stationary relative to the lens portion 101 and tilt pulley 205 resulting in no tilting of the lens portion 101. Therefore, in some embodiments, the lens portion's tilt may be dependent on the relative difference in position between the pan plate 203 and the tilt plate 209. Other configurations are also contemplated.

In some embodiments, the tilt plate 209 and pan plate 203 may be substantially coplanar. In some embodiments, the tilt plate 209 and pan plate 203 may overlap. The tilt plate 209 and pan plate 203 may be partially circular, and may extend through less than 180 degrees. Other configurations are also contemplated. As the pan plate 203 moves, an area for the tilt plate 209 to pass through may correspondingly move. In some embodiments, the tilt range provided at each panned position may be substantially similar, even though the tilt plate 209 may move through a different position relative to the base portion 105. Specifically, in some embodiments, the tilt of the lens portion 101 may be relative to the difference in position between the tilt plate 209 and the pan plate 203.

In some embodiments, to execute a pan motion with no tilting, both motors and plates may be driven substantially simultaneously so that there is no relative motion between the two plates. As another example, to execute a tilt movement, plate 203 may be held stationary by motor 201 while motor 207 drives plate 209. If plate 209 were held stationary by motor 207 while motor 201 drove plate 203, the result may be a diagonal motion because there is relative motion between the plates. Other motor and plate configurations are also contemplated.

In some embodiments, the motors 201 and 207 may be fixed. In some embodiments, the motors may be on moving parts within the camera 100. In some embodiments, the FPGA 321 may determine appropriate responses for the motors based on their current positions and the effect on their positions caused by the movement of other motors being controlled by the FPGA 321 (e.g., the motion of a motor caused by another motor's actions).

Figure 3:
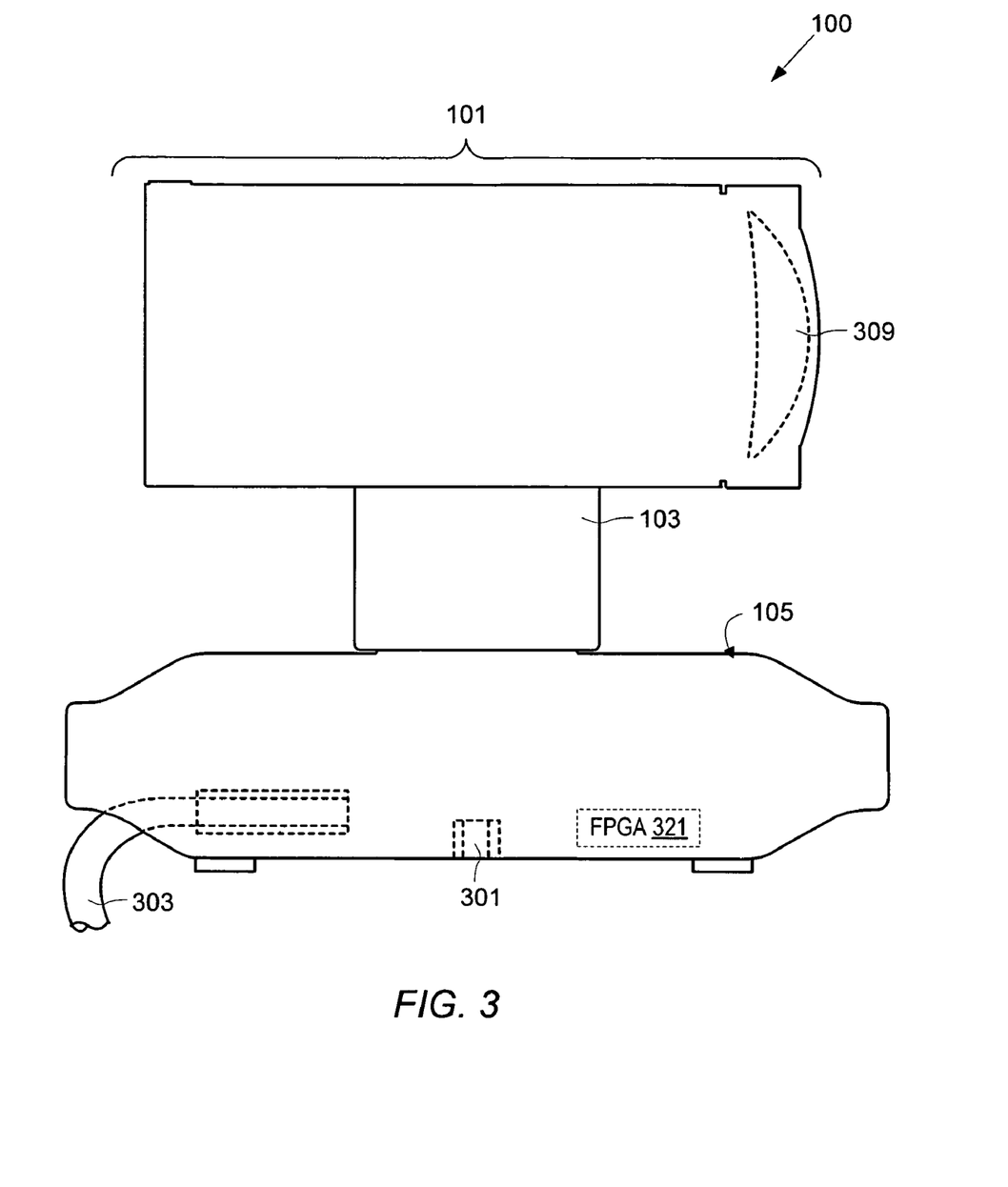
FIG. 3 illustrates a side view of the internal components of the camera, according to an embodiment.

FIG. 3 illustrates a side view of the internal components of the camera 100, according to an embodiment. In some embodiments, a screw hole 301 for a tripod mount screw may be provided. The camera 100 may attach to a mount through the tripod mount screw (other fasteners are also contemplated). In some embodiments, the camera 100 may use a wide angle lens 309 to capture an image of a participant even at a close angle. A data cable 303 may provide a link for data to and from the camera 100. In some embodiments, the data cable 303 may curve downward without going past the back of the camera (e.g., to make the camera 100 easier to mount against a wall or other flat surface). FPGA 321 is shown in the base of the camera 100. The FPGA 321 may be located in other areas of the base. In some embodiments, the FPGA 321 may be located in the lens portion of the camera 100. Other placements of the FPGA 321 are also contemplated. In some embodiments, the signal from the camera 100 may be digitized before being sent down the data cable 303 in a high-speed serial digital stream. Other data types and conversions are also contemplated. For example, an industry standard electrical (Low Voltage Differential Signaling (LVDS)) and/or mechanical (e.g., Firewire/IEEE1394) interface may be used. In some embodiments, the data cable 303 may be thin and flexible. The data cable 303 may provide a digital interface to the camera 100 with, for example, six wires from the camera 100 to the camera base 105. Other numbers of wires may also be used. In some embodiments, the data cable 303 may form a high-speed digital bus for carrying digitized microphone data, digital image data, bi-directional control data for controlling pan, tilt, focus, zoom motors, iris motors, and/or power to the camera 100. In some embodiments, the data cable 303 may be up to 50 feet long. Other lengths are also contemplated. In some embodiments, the data cable 303 may run up one of the yoke arms 103 of the camera 100 to the central components of the lens portion 101. In some embodiments, the data cable 303 may run up the other of the yoke arms 103 that does not contain the tilt cable 211.

Figure 4:
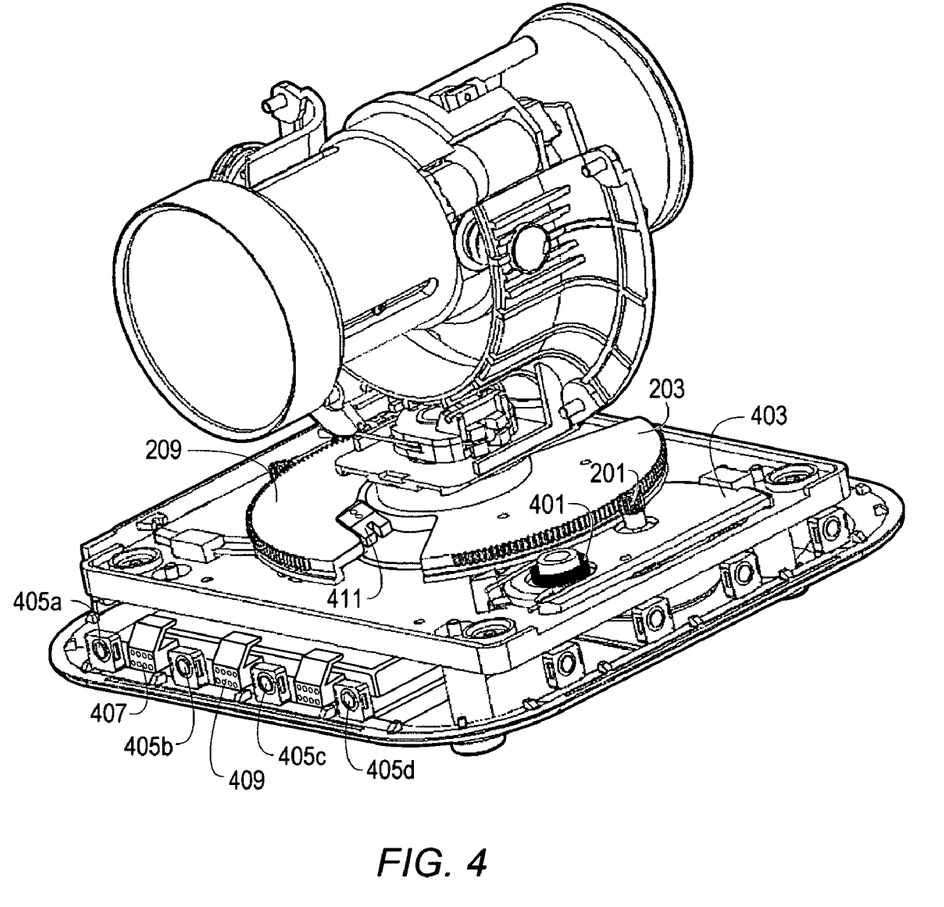
FIG. 4 illustrates another view of the internal components of the camera, according to an embodiment.

FIG. 4 illustrates another view of the internal components of the camera 100, according to an embodiment. In some embodiments, a detector (e.g., an opto-interrupter 411 comprising a light emitting diode (LED) and phototransistor which detect when a corresponding blade passes between them) on the gear plate 209 may be used to stop panning or tilting of the camera 100 if the camera 100 is panned or tilted past a predefined point (e.g., a blade may be placed on gear plate 203 or gear plate 203 may pass between the LED and phototransistor). Other detectors are also contemplated. In some embodiments, additional opto-interrupters may be put on the other gear plate 203. In some embodiments, the opto-interrupters may be put on both sides of each gear plate to detect when the camera 100 was rotated or tilted past each end of a predefined point. There may be also be opto-interrupters on the reference plate 291 (the large, stationary, rectangular part that supports the moving elements) that define the limits of motion for plate 203 (and/or gear plate 209), preventing the unit from trying to pan or tilt beyond an allowable range. Since tilt angle may be determined by the relative motion between plates 203 and 209, the opto-interrupters that define the tilt limits may be mounted on one of the plates 203 and 209 and sense the position of the tilt plate 209 relative to the pan plate 203.

In some embodiments, ball bearings may be placed between portions of the tilt plate 209 and pan plate 203. In some embodiments, a spring 401 may bias the motor support plate 403 toward the center of the camera 100. This bias may keep the motor gear 201 in contact with the gear plate 203. In some embodiments, various parts of the camera 100 (e.g., casing, plates, pulleys, etc.) may be injection molded (e.g., using acetal, polycarbonate, and/or acrylonitrile butadiene styrene, etc.). Other manufacturing mechanisms and materials are also contemplated.

In various embodiments, an array of microphones 405 may be used to point the camera 100 in the direction of a speaking participant. The signals from the microphones 405 may be beamformed to determine the direction of arrival. The camera 100 may then be aimed at a participant or another source of audio. In some embodiments, eight low noise microphones 405 may be integrated into the camera 100. Other numbers of microphones and other microphone array orientations may be used. In some embodiments, the camera 100 may not have microphones (e.g., it may be steered by a user). Digitized microphone data may be sent down the data cable 303.

In some embodiments, the location or angle of a participant relative to the camera 100 may be determined by beamforming data from the microphones 405. The microphone positions relative to the camera 100, along with the angle and zoom of the camera 100 may be known. The microphone positions, camera angle, and camera zoom may then be used in conjunction with the data from the microphones 405 to determine the angle of the participant relative to the true visual field of the camera 100. In some embodiments, the spatial positioning of the participant relative to the visual field may be determined and the camera 100 may be steered/aimed to center on the participant (or may be steered to another predetermined angle and zoom relative to the participant).

In some embodiments, a remote control sensor 407 may be provided. In some embodiments, multiple remote control sensors may be provided to make it easier for the camera 100 to receive signals from a remote control. In some embodiments, the camera 100 may receive signals through the remote control sensor 407 from an integrated unit and/or codec managing a video conference call. Additional connectors may also be provided. For example, light-pipe 409 may be provided (e.g., for a light emitting diode (LED) on a circuit board behind the light-pipe 409). The LED may be used to indicate when a signal is received from the remote control or may be illuminated when the camera 100 is powered. Other uses for the LED are also contemplated.

Camera Support Mechanism

Figure 5:
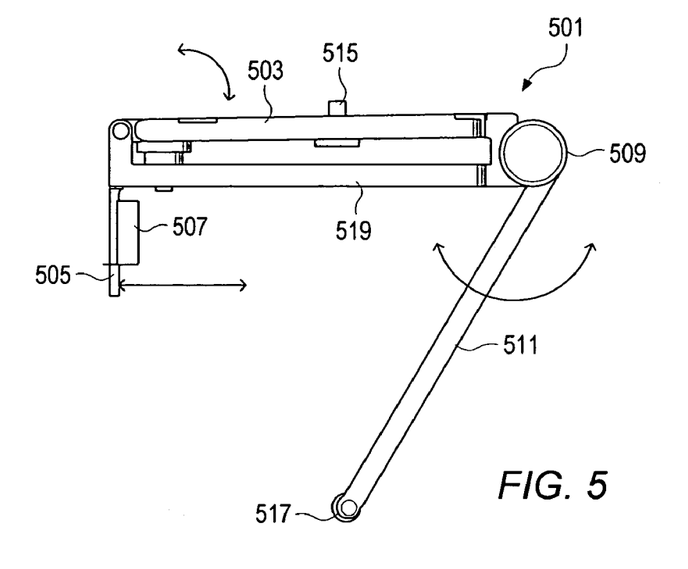
FIG. 5 illustrates a side view of the camera support mechanism, according to an embodiment.
Figure 6:
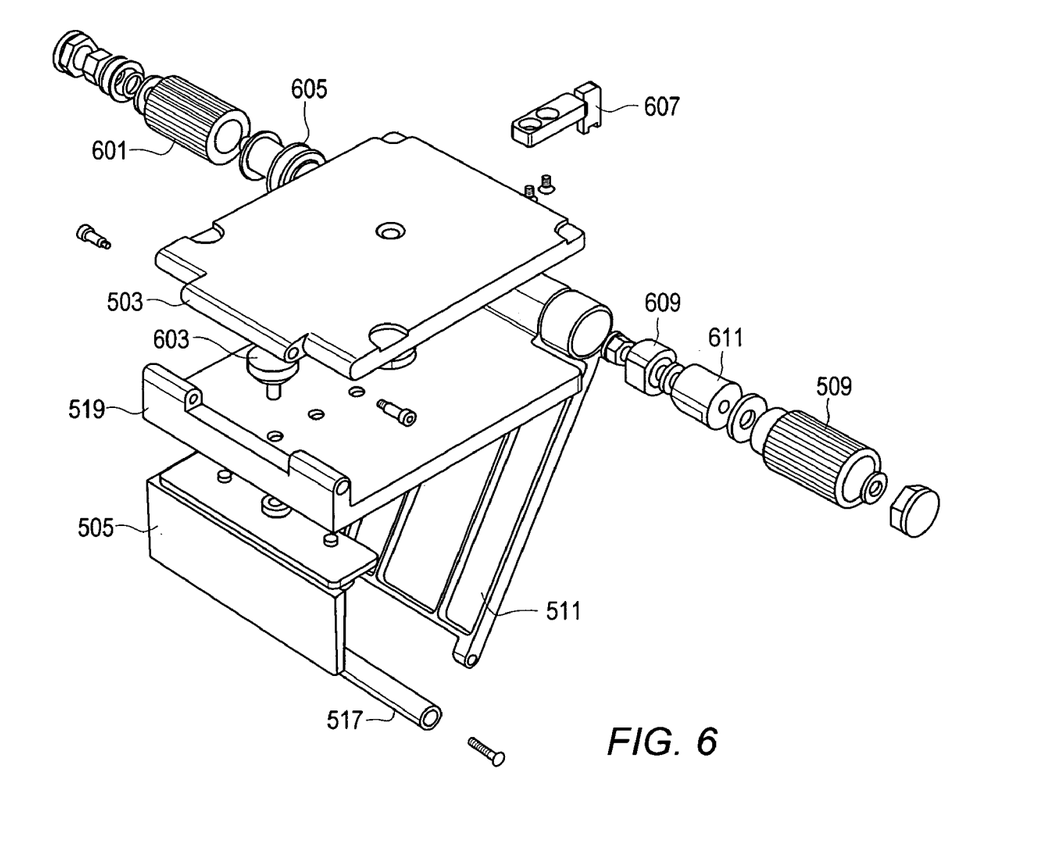
FIG. 6 illustrates an exploded view of the camera support mechanism, according to an embodiment.

As seen in FIGS. 5 and 6, in various embodiments, a camera support mechanism (CSM) 501 may be used to mount a camera on top of a television (TV) or display device. The CSM 501 and camera may be installed on top of a monitor very quickly (e.g., in less than 1 minute). Other installation times are also contemplated. The CSM 501 may work for a video conferencing pan-tilt-zoom camera, or may be used for mounting any object on top of another object with a variable shape and thickness. This could be adapted for example to place a Digital Versatile Disc (DVD) player and/or a satellite receiver on top of the TV.

In various embodiments, the CSM 501 may have an upper deck 503 (which may be flat) that folds open to access a tripod mount screw 515 that couples the camera to the CSM 501. Other fasteners may also be used to couple the camera to the CSM 501. In some embodiments, the CSM 501 may not have a flat top that folds open. After attaching the camera to the top of the CSM 501, the CSM 501 may be placed on the top center of the display device. The CSM 501 may have an adjustable front lip 505 (adjustable in an approximate range of plus or minus 5 degrees) that aligns to the top front edge of the display device. Other adjustment ranges are also contemplated. This may compensate for any "droop" of the lower deck when the CSM 501 is mounted to a display. (The camera lens may pan tilt in a range of approximately +/−25 degrees. Other camera tilt ranges are also contemplated.) In some embodiments, the front lip 505 may be attached to a lower deck 519 through a mount screw 603. Other fasteners between the front lip 505 and the lower deck 519 are also contemplated. The front lip 505 may have two separate offsets (e.g., foam rubber pads 507) that may cushion the contact with the display. Other numbers, shapes, and materials for the offsets are also contemplated. In some embodiments, if multiple pads 507 are used, the CSM 501 may work with display devices that have either a concave or a convex front surface. In some embodiments, the CSM 501 may work with display devices that have either a concave or a convex surface if a single pad is used. The front lip 505 may be adjusted to one of a number of set positions so that the CSM 501 can accommodate even extremely thin screens that may be wall mounted. For thin display devices mounted to a wall, the CSM 501 and camera may actually extend a couple of inches in front of the display in order for the back of the CSM 501 to not hit the wall.

In some embodiments, when the CSM 501 is placed on the display, a user may tighten adjustment knob 509 on one side of the pivot point at the rear of the CSM 501. In some embodiments, the adjustment knob 509 may be a large knurled plastic knob. Other materials and shapes are also contemplated. This may rotate the adjustable rear leg 511 towards the back of the display. In some embodiments, the rear leg 511 may rotate from flat and parallel to the top of the display to perpendicular to the top of the display. In some embodiments, the rear leg 511 may accommodate different monitors or TVs (e.g., monitor based displays, rear-projection displays LCD displays, and plasma screens). When the rear leg 511 has rotated to the point where it makes contact with the display, further tightening of the knobs 509 may apply additional pressure. The rear leg 511 may be tightened to lock the rear leg 511 firmly against the back of the display at that position. In some embodiments, the lower deck face gear 609 and leg face gear 611 may be used to move and/or tighten the rear leg 511. In some embodiments, the two face gears 609,611 may disengage to allow the rear leg 511 to swing against the back of the display. Then the face gears 609,611 may engage to lock the rear leg 511 in one position. In some embodiments, conical mating surfaces may be used in place of face gears 609, 611. For example, conical mating surfaces (similar to a conical clutch) may be used to allow continuous stopping positions for the rear leg 511. In some embodiments, discrete stopping distances may be used. In some embodiments, the rear leg 511 may have a foam/rubber tip 517 for better gripping. In some embodiments, the CSM 501 may also accommodate variable slope on the screen from front to back using the foam/rubber tip 517.

Figure 7:
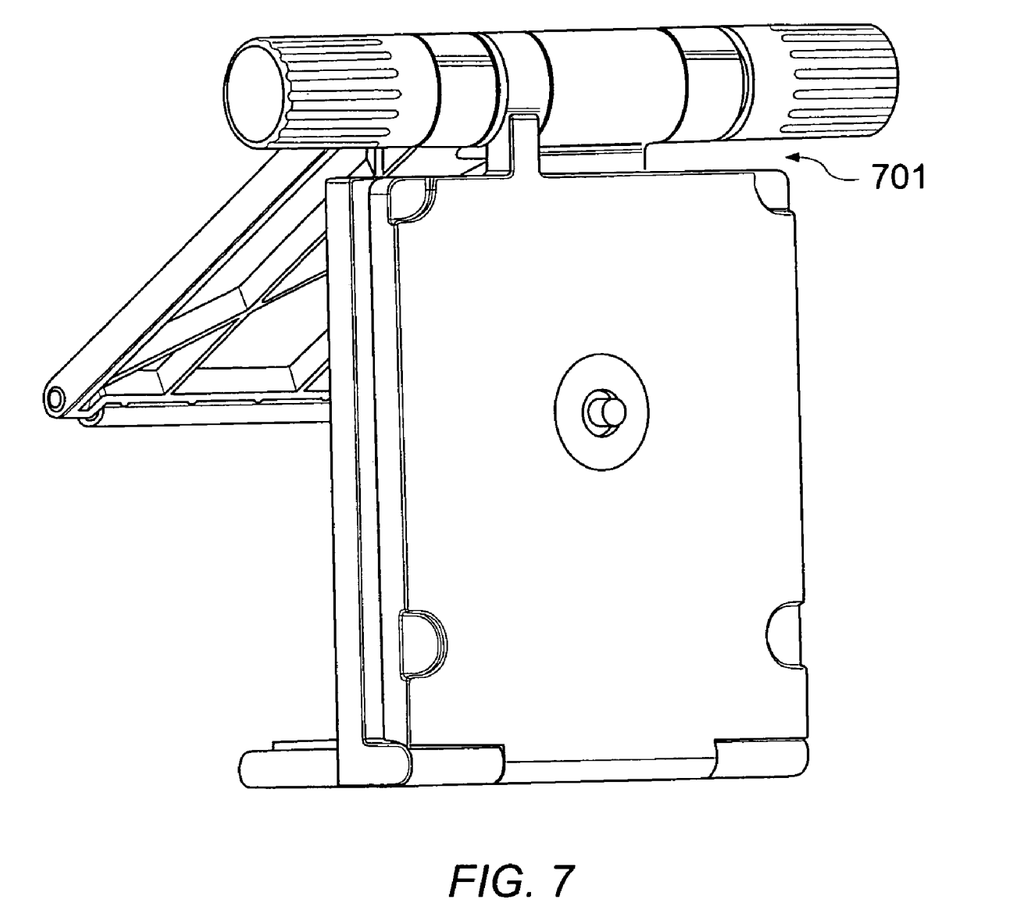
FIG. 7 illustrates a top view of the camera support mechanism with a cable slot, according to an embodiment.

In some embodiments, with the CSM 501 firmly attached to the display, the camera may be relatively flat but may not be perfectly lined up with the top of the display device resulting in a tilt offset. By turning the lifter knob 601 (as seen in FIG. 6) on the CSM 501, the angle of the camera can be adjusted up or down approximately in a range of plus or minus 10 degrees (other ranges are also contemplated). In some embodiments, the lifter knob 601 may be made of knurled plastic. Other materials and shapes are also contemplated. In some embodiments, the lifter cam 605 may adjust the angle of the camera as the lifter knob 601 is turned to raise lift 607. The back of the CSM 501 may have a slot 701 (as seen in FIG. 7) in front of the adjustment knobs that may be used to route the camera cable without increasing the overall depth. Other locations for the slot 701 are also contemplated. In some embodiments, the electronics from the camera in the video conferencing system may be split in order to use a smaller mount for fitting the camera on top of the display device. In some embodiments, a cam follower arm 609 may be used to tilt the upper deck 503 approximately in a range of plus or minus 5 degrees (other ranges are also contemplated).

Figure 8:
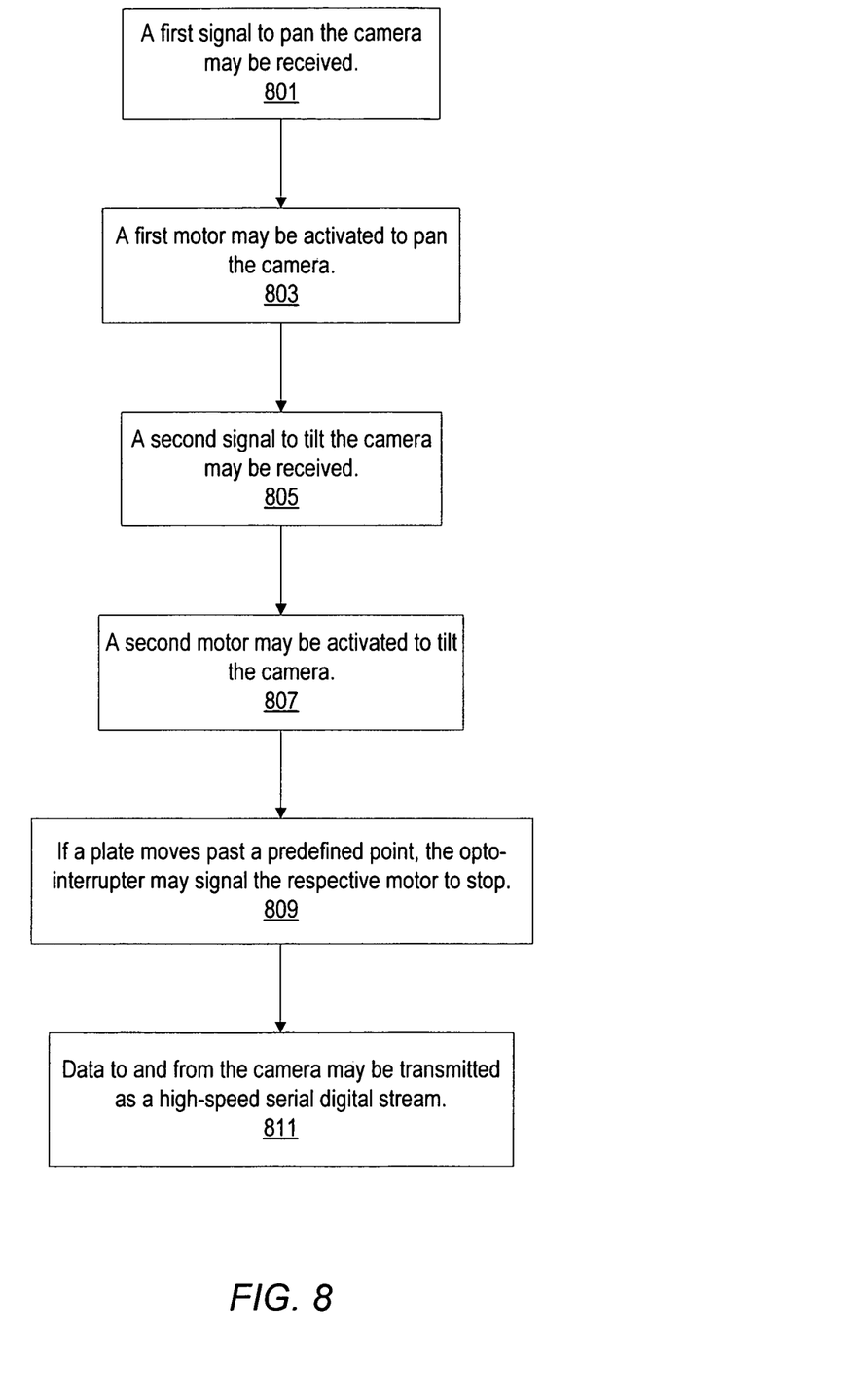
FIG. 8 illustrates a method of positioning an camera, according to an embodiment.

FIG. 8 illustrates a method of positioning a camera 100, according to an embodiment. It is noted that in various embodiments one or more of the method elements may be performed concurrently, in a different order, or be omitted. Additional elements may be performed as desired.

At 801, a first signal to pan the camera 100 may be received.

At 803, a first motor (e.g., pan motor 201) may be activated to pan the camera 100. In some embodiments, the first motor may pan the camera 100 through rotation of a pan plate 203 coupled to the camera 100.

At 805, a second signal to tilt the camera 100 may be received.

At 807, a second motor (e.g., tilt motor 207) may be activated to tilt the camera 100. In some embodiments, the second motor may tilt the camera 100 through rotation of a tilt plate 209 coupled to the camera 100 through cables in an arm of the camera 100.

At 809, if the pan plate 203 or the tilt plate 209 moves past a predefined point (as detected by an opto-interrupter), the opto-interrupter 411 may signal the first motor or the second motor, respectively, to stop. In some embodiments, the signal may be received by the FPGA that may signal the first motor or second motor to stop.

At 811, data to and from the camera 100 may be transmitted as a high-speed serial digital stream through a thin cable coupled to the camera 100.

Figure 9:
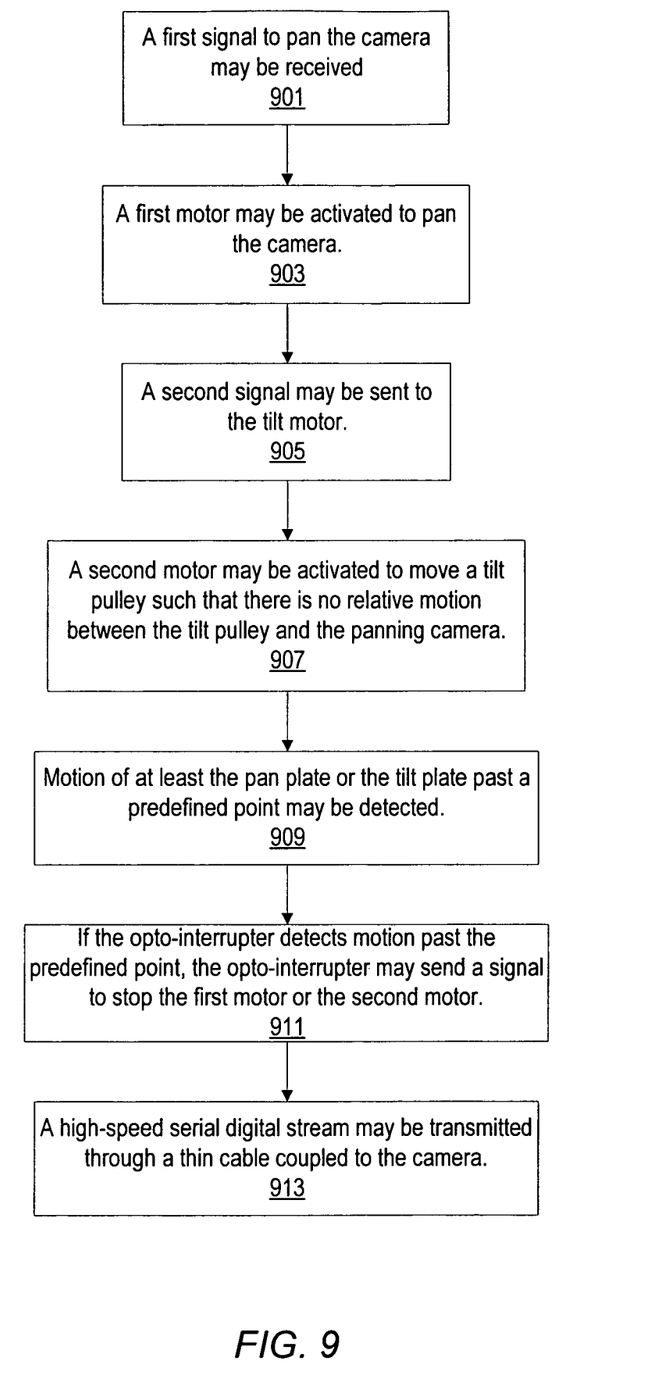
FIG. 9 illustrates a method of panning a camera, according to an embodiment.

FIG. 9 illustrates a method of panning a camera 100, according to an embodiment. It is noted that in various embodiments one or more of the method elements may be performed concurrently, in a different order, or be omitted. Additional elements may be performed as desired.

At 901, a first signal to pan the camera 100 may be received.

At 903, a first motor (e.g., pan motor 201) may be activated to pan the camera 100. In some embodiments, the first motor may pan the camera 100 through rotation of a pan plate 203 coupled to the camera 100.

At 905, a second signal may be sent to the tilt motor 207.

At 907, a second motor (e.g., tilt motor 207) may be activated to move a tilt pulley such that there is no relative motion between the tilt pulley and the panning camera.

At 909, motion of at least the pan plate or the tilt plate past a predefined point may be detected.

At 911, if the opto-interrupter detects motion past the predefined point, the opto-interrupter may send a signal to stop the first motor or the second motor.

At 913, a high-speed serial digital stream may be transmitted through a thin cable coupled to the camera.

Embodiments of these methods may be implemented by program instructions stored in a memory medium or carrier medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising: a camera comprising a lens portion; a base portion, the base portion comprising: a pan plate coupled to the lens portion; a first motor coupled to the pan plate, wherein the first motor is operable to move the pan plate which is operable to pan the lens portion; a tilt plate coupled to the lens portion; a second motor coupled to the tilt plate, wherein the second motor is operable to move the tilt plate; wherein the tilt plate is coupled to the lens portion through a tilt mechanism, the tilt mechanism comprising: a tilt pulley coupled to the tilt plate, wherein the tilt pulley is operable to be rotated by the tilt plate; and a cable coupled to the tilt pulley and to the lens portion, wherein the cable is operable to tilt the lens portion when the tilt pulley rotates relative to the lens portion; wherein the lens portion is coupled to the base portion through a yoke arm, wherein the yoke arm is at least partially hollow and wherein the cable runs through at least a portion of the yoke arm.

2. The apparatus of claim 1, wherein the tilt motor is operable to rotate the tilt pulley through the tilt plate to offset relative motion of the tilt pulley with respect to the lens portion when the lens portion is panned.

3. The apparatus of claim 1, wherein the camera is a high definition camera.

4. The apparatus of claim 1, wherein at least one of the pan motor and tilt motor is biased against the pan plate or tilt plate.

5. The apparatus of claim 1, further comprising an opto-interrupter on at least one of the pan plate and the tilt plate, wherein the opto-interrupter is operable to detect motion of the at least pan plate or tilt plate past a predefined point.

6. The apparatus of claim 5, wherein the opto-interrupter is operable to send a signal to stop the first motor or second motor if the opto-interrupter detects motion past the predefined point.

7. The apparatus of claim 1, further comprising:
a thin cable coupled to the camera, wherein the thin cable is operable to transmit a high-speed serial digital stream.

8. The apparatus of claim 7, wherein the thin cable is operable to carry digitized microphone data and digital image data.

9. The apparatus of claim 7, wherein the thin cable is operable to carry bi-directional control data for controlling the first motor, second motor, focus motor, zoom motor, iris motor, or power to the camera.

10. The apparatus of claim 1, further comprising an array of microphones coupled to the camera, wherein the array of microphones is used to detect a direction to a sound source.

11. The apparatus of claim 1, further comprising a remote control sensor coupled to the camera.

12. The apparatus of claim 1, further comprising a field programmable gate array (FPGA) operable to control the pan motor and tilt motor in the base of the camera.

* * * * *